(12) United States Patent
Lin et al.

(10) Patent No.: US 8,191,143 B1
(45) Date of Patent: May 29, 2012

(54) ANTI-PHARMING IN WIRELESS COMPUTER NETWORKS AT PRE-IP STATE

(75) Inventors: Kun-Shan Lin, Taipei (TW); Pei-Chun Yao, Taipei (TW); Chia-Chi Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1232 days.

(21) Appl. No.: 11/985,124

(22) Filed: Nov. 13, 2007

(51) Int. Cl.
*H04L 29/06* (2006.01)

(52) U.S. Cl. .............................. 726/23; 726/27; 713/153

(58) Field of Classification Search .................... 726/22, 726/23, 25, 26, 27; 713/151, 153, 158; 455/411; 709/234
See application file for complete search history.

(56) References Cited

U.S. PATENT DOCUMENTS

| | | | |
|---|---|---|---|
| 8,019,856 B1 * | 9/2011 | Lin et al. ........................ | 709/224 |
| 2005/0213553 A1 * | 9/2005 | Wang .............................. | 370/349 |
| 2005/0238005 A1 * | 10/2005 | Chen et al. ..................... | 370/389 |
| 2005/0271049 A1 * | 12/2005 | Jain et al. ....................... | 370/389 |
| 2006/0253458 A1 | 11/2006 | Dixon et al. | |
| 2006/0253578 A1 | 11/2006 | Dixon et al. | |
| 2006/0253579 A1 | 11/2006 | Dixon et al. | |
| 2006/0253580 A1 | 11/2006 | Dixon et al. | |
| 2006/0253581 A1 | 11/2006 | Dixon et al. | |
| 2006/0253582 A1 | 11/2006 | Dixon et al. | |
| 2006/0253583 A1 | 11/2006 | Dixon et al. | |
| 2006/0253584 A1 | 11/2006 | Dixon et al. | |
| 2008/0009266 A1 * | 1/2008 | Yamasaki et al. ............. | 455/411 |
| 2008/0222352 A1 * | 9/2008 | Booth et al. ................... | 711/108 |

OTHER PUBLICATIONS

DHCP—Knowledge Base, University Information Technology Services, Indiana University, Sep. 11, 2007, 1 sheet [retrieved on Nov. 5, 2007] [retrieved from the internet: <URL:http://kb.iu.edu/data/adov.html].
IEEE 802.11—Wikipedia, the free encyclopedia, 9 sheets [retrieved on Nov. 5, 2007] retrieved from the internet: <URL:http://en.wikipedia.org/wiki/IEEE_802.11.
Wireless access point—Wikipedia, the free encyclopedia, 3 sheets [retrieved on Nov. 5, 2007] retrieved from the internet: <URL:http://en.wikipedia.org/wiki/Wireless_access_point.
Intelligraphics—Introduction to IEEE 802.11, 1997, 6 sheets [retrieved on Nov. 6, 2007] retrieved from the internet: <URL:http://www.intelligraphics.com/articles/80211_article.html.
Packet (information technology)—Wikipedia, the free encyclopedia, 5 sheets [retrieved on Nov. 7, 2007] retrieved from the internet: <URL:http://en.wikipedia.org/wiki/Data_packet.

* cited by examiner

*Primary Examiner* — Hadi Armouche
(74) *Attorney, Agent, or Firm* — Okamoto & Benedicto LLP

(57) ABSTRACT

Anti-pharming techniques in wireless computer networks at pre-IP state are disclosed. A user computer connecting to a wireless computer network may include an anti-pharming module configured to monitor data communications to and from a wireless access point of the wireless computer network. The anti-pharming module may be configured to determine if data communication going in a direction from the wireless access point to the user computer originated from a wireless station rather than a server configured to dynamically provide network addresses to computers connecting to the wireless computer network. The wireless station may be deemed a malicious computer perpetrating a pharming attack when it originated the data communication and is responding to a request to obtain network address previously sent by the user computer.

15 Claims, 6 Drawing Sheets

ANTI-PHARMING IN WIRELESS COMPUTER NETWORKS AT PRE-IP STATE

BACKGROUND OF THE INVENTION

1. Field of the Invention

The present invention relates generally to computer security, and more particularly but not exclusively to methods and apparatus for combating pharming in wireless computer networks.

2. Description of the Background Art

The freedom and convenience provided by wireless technology make wireless computer networks very popular among computer users. It is thus not surprising that wireless computer networks can be found in many locations, including private offices, airports, cafés, and even residential neighborhoods. Unfortunately, the advantages of wirelessly sending and receiving data over the airwaves can be exploited not just by legitimate users, but also by malicious ones. Unlike data transmission over a cable, wirelessly transmitted data are readily available for monitoring and acquisition by the general public. Although encryption provides some measure of security for wireless data communication, there are situations where encryption is not enough to protect computers against security threats. Embodiments of the present invention address possible vulnerabilities in wireless computer networks.

SUMMARY

In one embodiment, a user computer connecting to a wireless computer network may include an anti-pharming module configured to monitor data communications to and from a wireless access point of the wireless computer network. The anti-pharming module may be configured to determine if data communication going in a direction from the wireless access point to the user computer originated from a wireless station rather than a server configured to dynamically provide network addresses to computers connecting to the wireless computer network. The wireless station may be deemed a malicious computer perpetrating a pharming attack when it originated the data communication and is responding to a request to obtain network address previously sent by the user computer.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
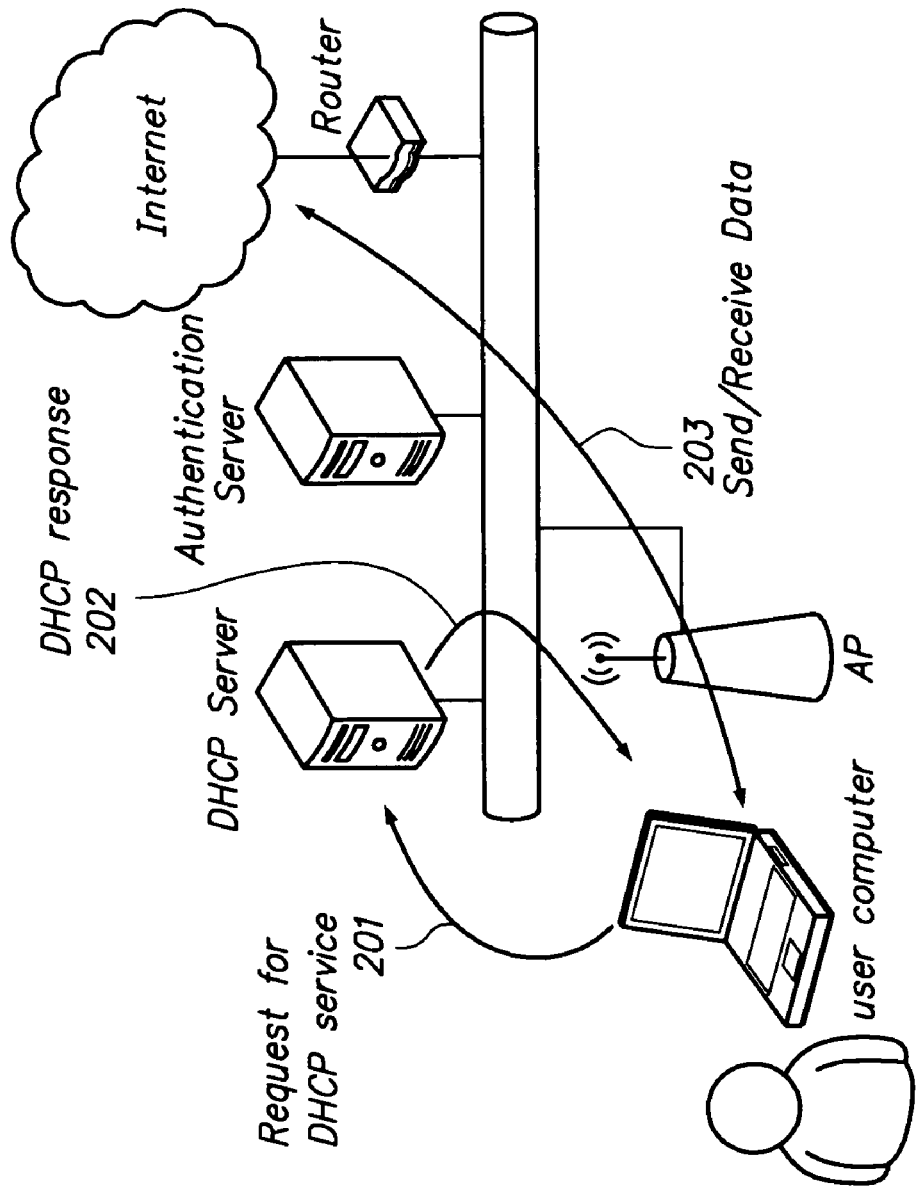
FIG. 1 shows a flow diagram of a user computer connecting to a wireless computer network.

FIG. 1 shows a flow diagram of a user computer connecting to a wireless computer network. In the example of FIG. 1, the wireless computer network includes a wireless access point ("AP") for connecting wireless communication devices to the wireless computer network, a DHCP (dynamic host control protocol) server for dynamically assigning IP (Internet protocol) addresses to computers in the network, an authentication server for verifying the authorization of wireless stations to connect to the network, and a router for connecting to another, typically wired, computer network. The wireless computer network allows the user to access another computer network, such as the Internet, for example. The user computer is depicted as a laptop computer in FIG. 1. As can be appreciated, the user computer may also be another mobile computing device, such as a personal digital assistant (PDA), network enabled mobile telephone (e.g., APPLE iPhone™ telephone), tablet PC, and other Wi-Fi devices.

In accordance with DHCP, the user computer, also referred to as "DHCP client," sends a request for DHCP service to the DHCP server to access the wireless computer network (arrow 201). The request for DHCP service may include the user computer discovering the DHCP server by making a DHCP-DISCOVER broadcast request. The DHCP server responds to the request (arrow 202) by offering the user computer, by way of a DHCPOFFER, an IP address to be used by the user computer and to configure the user computer's DNS servers, WINS servers, NTP servers, and/or other services available on the wireless computer network. To complete the DHCP configuration, the user computer makes a DHCPREQUEST to the DHCP server to confirm it is accepting the DHCPOFFER. The DHCP server then sends a DCHPACK to the user computer to confirm that the user computer is allowed to use the provided IP address and configured DNS servers, etc.

Data communications between the user computer and the DHCP server occur during what is referred to as "pre-IP state" because these communications happen before the user computer's TCP/IP stack software has completed configuration to access the wireless computer network. After the pre-IP state, the user computer can connect to the wireless computer network to access services on the network including to connect to another computer network (arrow 203).

The inventors believe that a user computer is especially vulnerable to pharming attacks while attempting to connect to a wireless computer network during the pre-IP state. A pharming attack involves redirection of data communications through or to a malicious computer. A typical pharming attack involves DNS poisoning to redirect a user computer to a malicious website. However, pharming attacks may also involve placing a "man-in-the-middle" to eavesdrop on network data communications.

Figure 2:
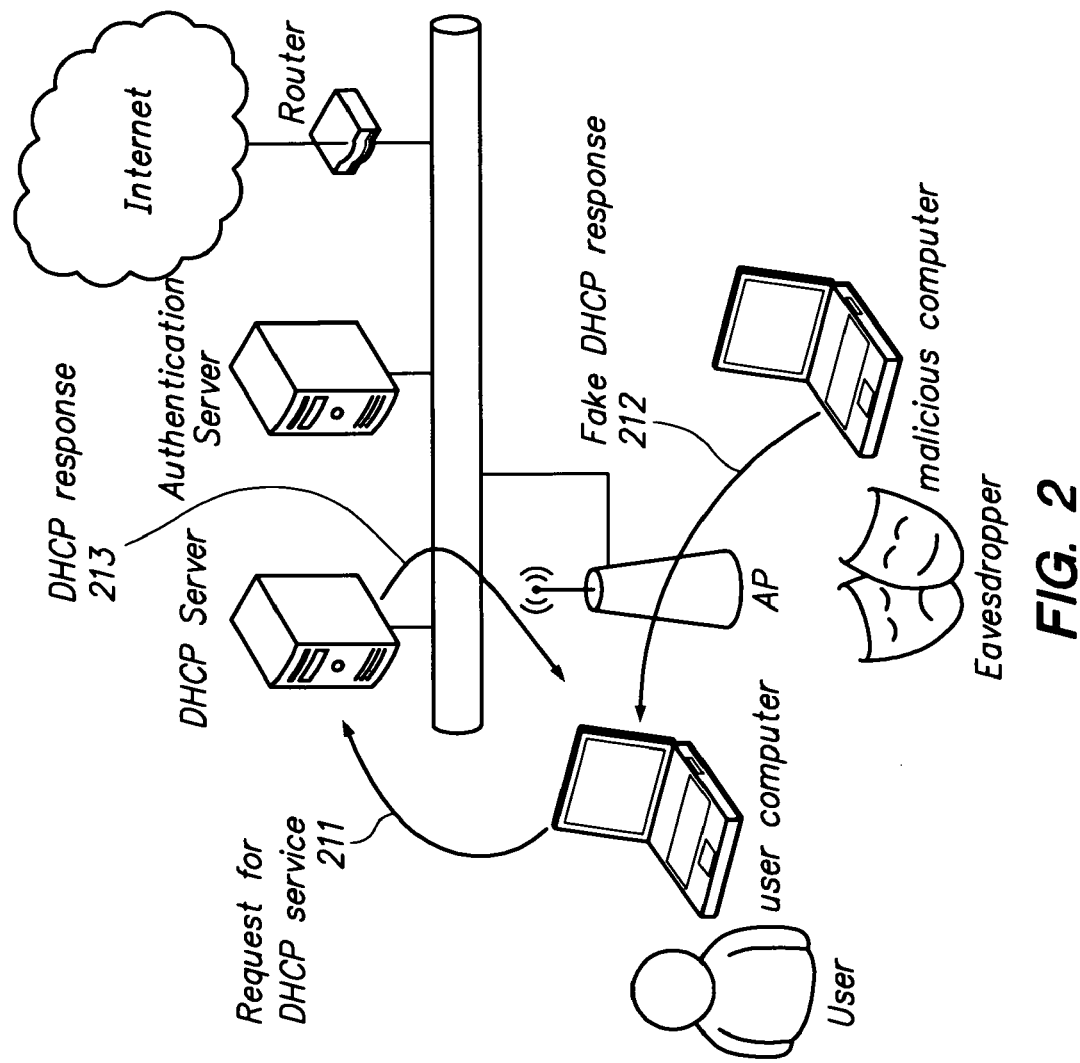
FIGS. 2 and 3 show a flow diagram of an example pharming attack.
Figure 3:
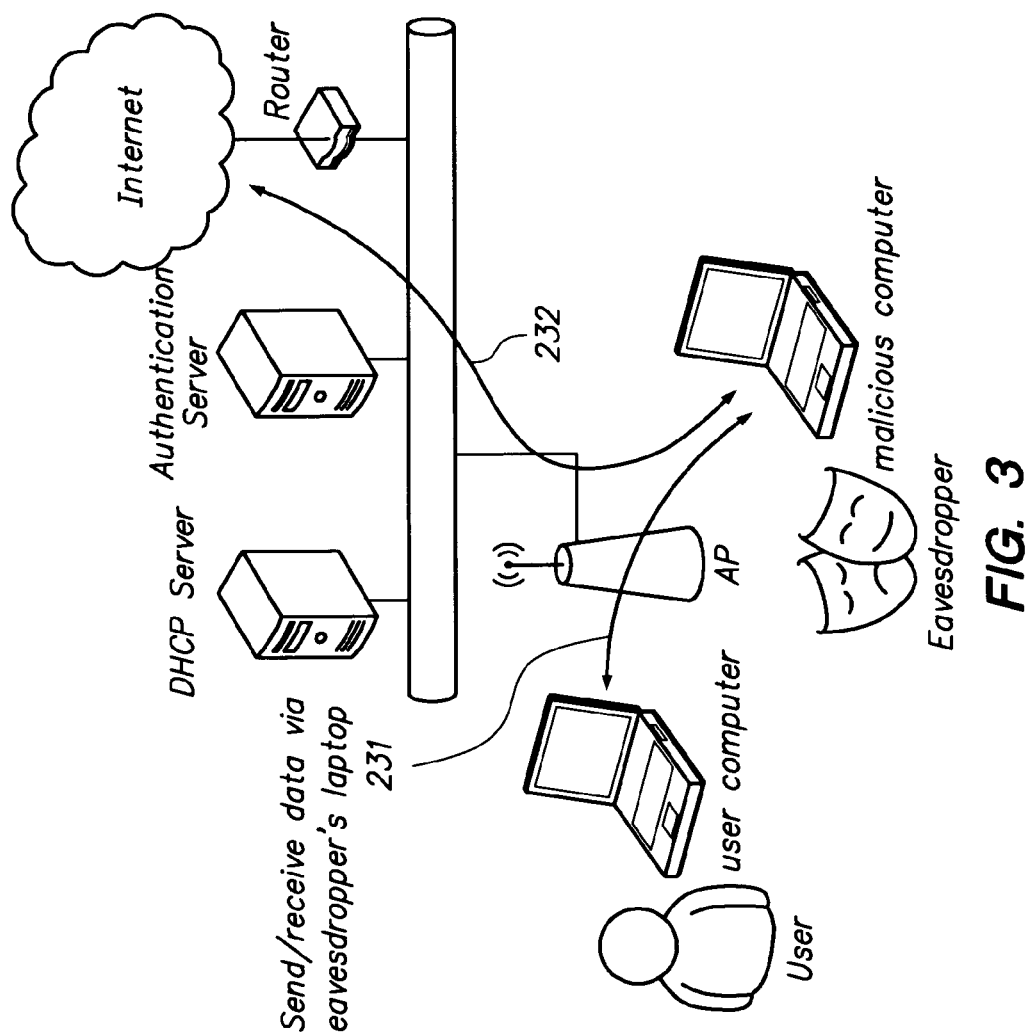

FIGS. 2 and 3 show a flow diagram of an example pharming attack that the inventors believe may be perpetrated during the pre-IP state of a user computer connecting to a wireless computer network. The user computer is at the pre-IP state when the attack is initiated as the user computer's TCP/IP stack network communications software has not been fully initialized to communicate over the wireless computer network. Referring first to FIG. 2, the user computer sends a request for DHCP service to the DHCP server of the wireless computer network in accordance with DHCP convention as in FIG. 1 (arrow 211). This time, however, an eavesdropper employing a malicious computer responds to the user computer with a fake response (arrow 212) before the user computer receives a response from the DHCP server (arrow 213). The malicious computer may send the fake DHCP response after the user computer has broadcast the DHCPDISCOVER to find the DHCP server but before the DHCP server sends the user computer a DHCPOFFER. This results in the user computer being configured to use the information from the malicious computer, rather than from the DHCP server, to configure its TCP/IP stack software. More specifically, the user computer would end up using an IP address, DNS server information, and other network information provided by the malicious computer, resulting in the user computer connecting to the wireless computer network through the malicious computer as shown in FIG. 3 (arrows 231 and 232). The malicious computer may direct the user computer to malicious websites (e.g., phishing websites), steal confidential information transmitted by the user computer, and perform other malicious actions against the user.

The just described pharming attack scenario is not only very damaging to the user but also relatively easy to implement using a computer with a wireless computer network interface in the vicinity of the user computer. This is a scenario that may occur in a large number of wireless computer network locations both public and private. As will be more apparent below, embodiments of the present invention advantageously protect computers from such an attack in a wireless computer network.

Figure 4:
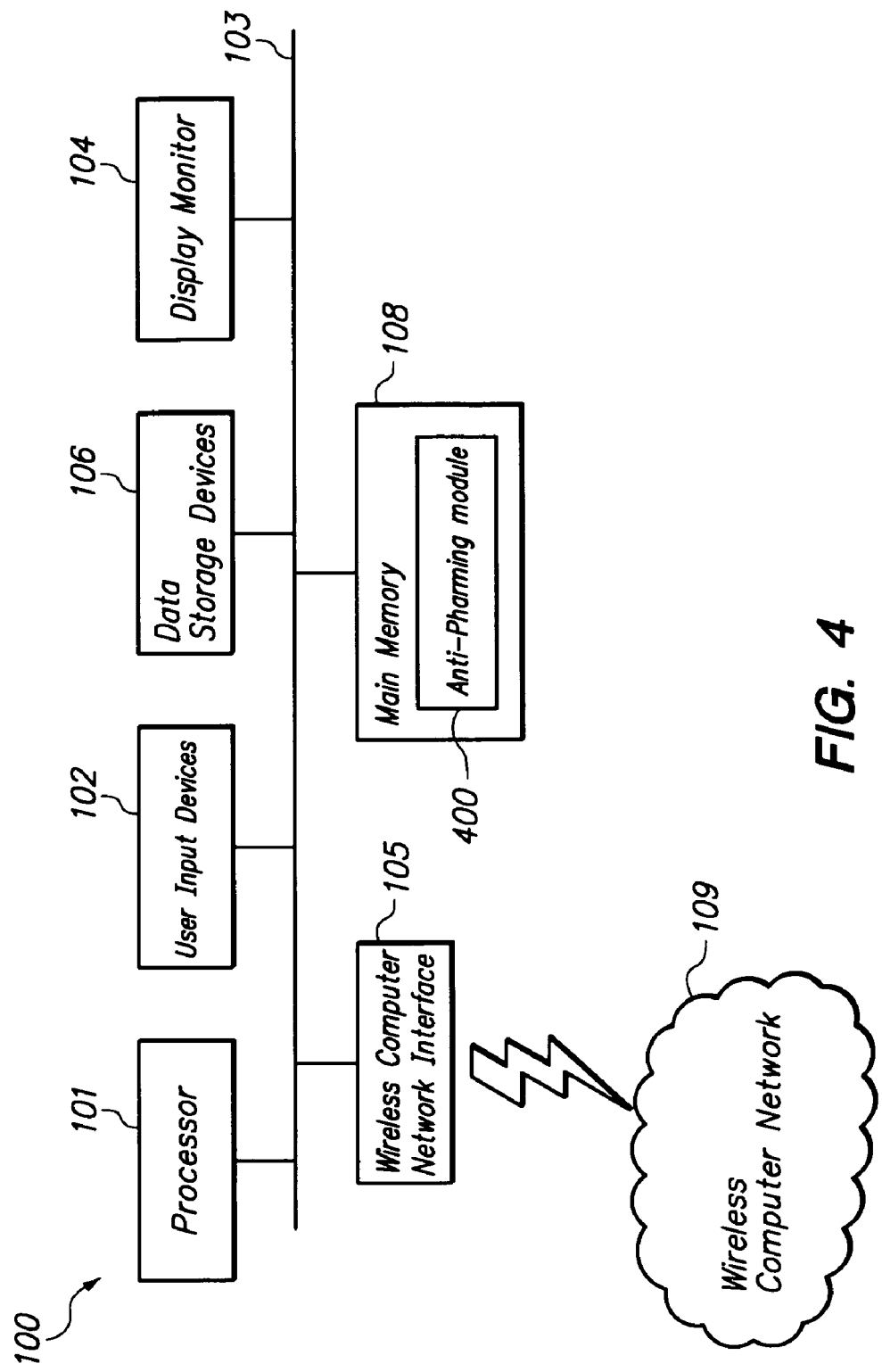
FIG. 4 shows a schematic diagram of a user computer in accordance with an embodiment of the present invention.

Referring now to FIG. 4, there is shown a schematic diagram of a user computer 100 in accordance with an embodiment of the present invention. The computer 100 may be employed as a user computer configured as a DHCP client, for example. The computer 100 may have less or more components to meet the needs of a particular application. The computer 100 may include a processor 101, such as those from the INTEL CORPORATION or ADVANCED MICRO DEVICES, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a wireless computer network interface 105 (e.g., Wi-Fi adapter), and a main memory 108 (e.g., RAM).

In the example of FIG. 1, the main memory 108 includes an anti-pharming module 400. The anti-pharming module 400 may be loaded from the data storage device 106 to the main memory 108 for execution by the processor 101. The wireless computer network interface 105 may be coupled to a wireless computer network 109, which in this example connects to the Internet.

The anti-pharming module 400 may comprise computer-readable program code for protecting the computer 100 against pharming attacks before the networking software of the computer 100 has been configured to generally communicate over a wireless computer network. Generally speaking, the anti-pharming module 400 looks for suspicious wireless data communication indicative of pharming.

In one embodiment, the anti-pharming module 400 is configured to detect responses from malicious computers impersonating a legitimate server for providing network information to connect to a wireless computer network. For example, the anti-pharming module 400 may be configured to monitor data communications between a wireless access point of a wireless computer network and wireless stations, to determine if data communication destined to the computer 100 originated from a wireless station rather than a DHCP server of the wireless computer network, and to deem the wireless station to be a malicious computer when the wireless station is responding to a request for DHCP service initiated by the computer 100 in its pre-IP state. The anti-pharming module 400 may be employed in conjunction with a variety of wireless computer network communication protocols, including the IEEE 802.11, for example.

Figure 5:
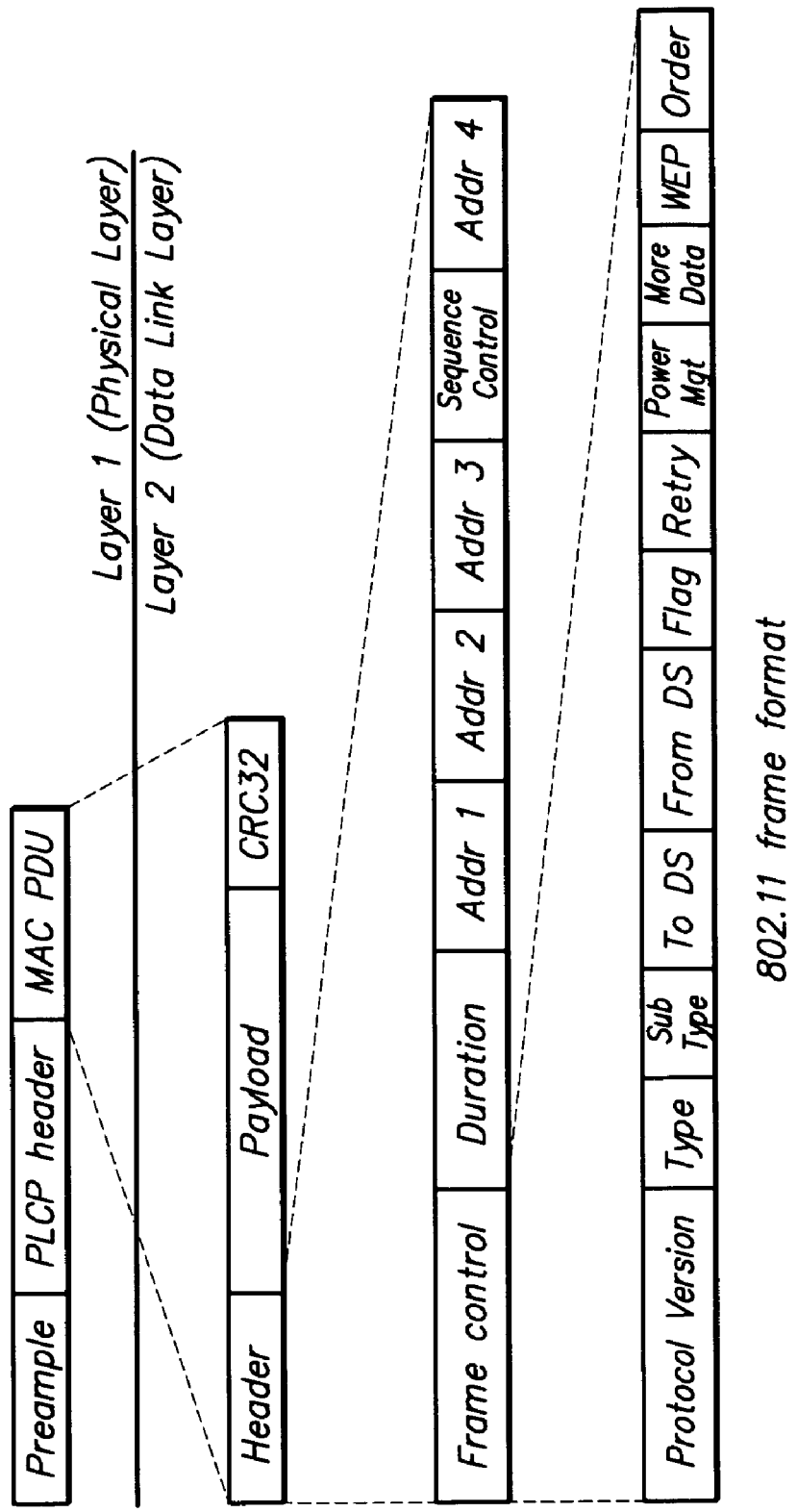
FIG. 5 schematically shows the frame format for the IEEE 802.11 standards for wireless computer network communications.

FIG. 5 schematically shows the frame format for the IEEE 802.11 standards for wireless computer network communications. The IEEE 802.11 standards are used throughout the computer industry for wireless computer networks. As shown in FIG. 5, the IEEE 802.11 frame format includes a "To DS" field and a "From DS" field in the frame control. These fields indicate the transmission direction of the frame. "DS" stands for "distribution system," which is the wireless computer network infrastructure in this example. In the context of DHCP in a wireless computer network, a set (i.e., logical 1) "To DS" field indicates data communication going in a direction from a user computer to the wireless computer network, while a set "From DS" field indicates data communication in a direction going from the wireless computer network to the user computer. Table 1 shows how the IEEE 802.11 frame format may be interpreted.

TABLE 1

| | To DS | From DS | Addr 1 | Addr 2 | Addr 3 |
|---|---|---|---|---|---|
| From STA to wireless access point | 1 | 0 | AP's MAC | Source MAC | Destination MAC |
| From wireless access point to STA | 0 | 1 | Destination MAC | AP's MAC | Source MAC |

In the example of Table 1, the wireless access point provides a node on which the user computer may wireless connect to the wireless computer network. The user computer and other computers connecting to the wireless computer network are referred to as wireless stations or STA. When the "To DS" field is set, the "Addr 1" field indicates the MAC (media access control) address of the wireless access point, the "Addr 2" field indicates the MAC address of the data source, and the "Addr 3" field indicates the MAC address of the data destination. When the "From DS" field is set, the "Addr 1" field indicates the MAC address of the data destination, the "Addr 2" field indicates the MAC address of the wireless access point, and the "Addr 3" field indicates the MAC address of the data source. A MAC address is a quasi-unique identifier for a hardware device, which may be that of a computer network interface.

In one embodiment, the anti-pharming module 400 monitors data communications from other wireless stations to identify these wireless stations and distinguish them from the DHCP server. During DHCP configuration in its pre-IP state, the anti-pharming module 400 may deem other wireless stations connecting to it and responding to a previous request for DHCP service as perpetrating a pharming attack because such wireless stations are not expected to communicate with the computer 100 before the computer 100 has completed configuring its networking software to connect to the wireless computer network.

Figure 6:
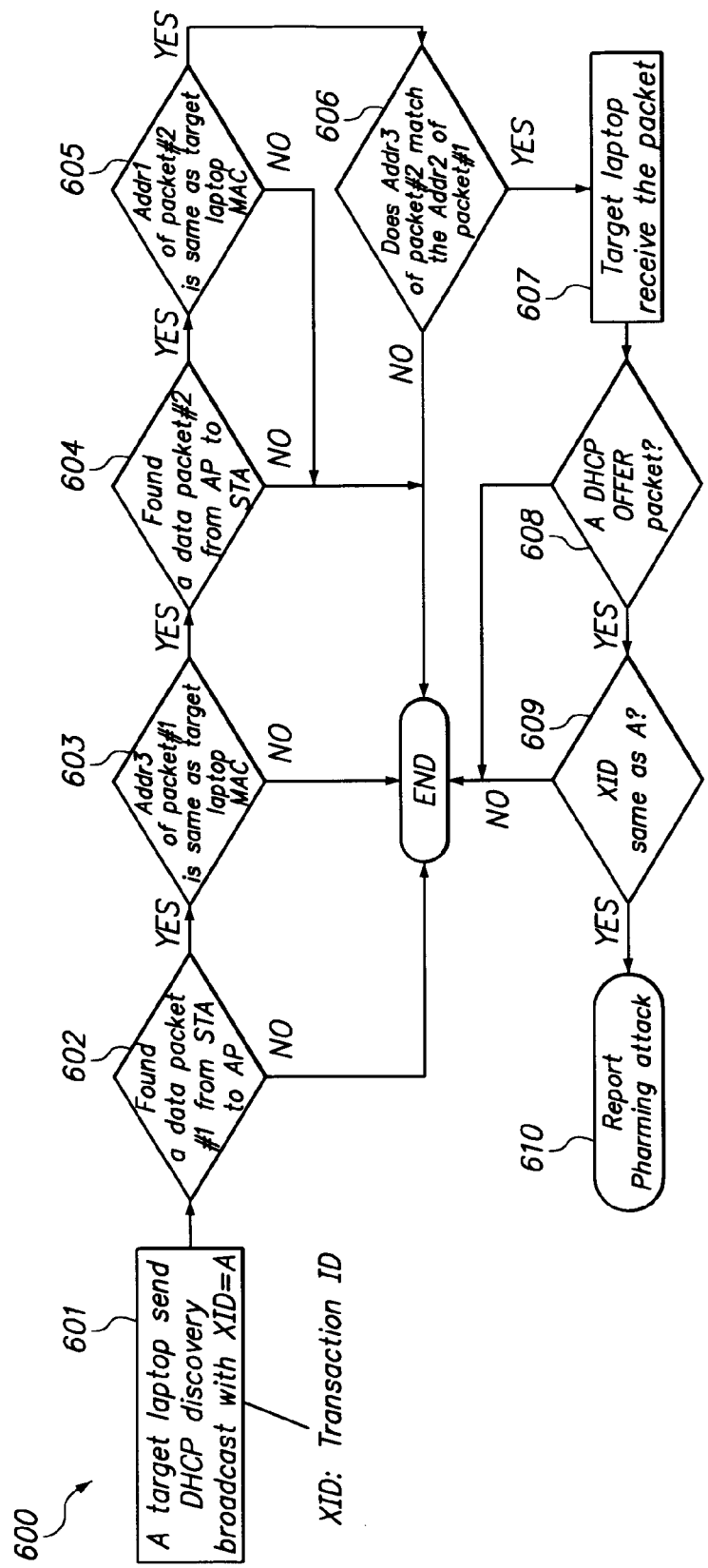
FIG. 6 shows a flow diagram of a method of detecting a pharming attack on a user computer in accordance with an embodiment of the present invention.

FIG. 6 shows a flow diagram of a method 600 of detecting a pharming attack on a user computer connecting to a wireless computer network before its networking software has been configured to communicate over the wireless computer network, in accordance with an embodiment of the present invention. The method 600 is explained using the computer 100 during DHCP configuration in its pre-IP state using the IEEE 802.11 standard as an example. The method 600 may be performed by the anti-pharming module 400.

In the example of FIG. 6, the computer 100 is labeled as a "target laptop" but may also be other types of wireless computing device. The method 600 may begin when the computer 100 first requests service to connect to the wireless computer network by, for example, looking for the DHCP server using a DHCPDISCOVER broadcast (step 601). The broadcast may be identified by its transaction ID, referred to as "XID" in FIG. 6. The anti-pharming module 400 monitors wireless data communications to and from the wireless access point for a first data packet originating from another wireless station (i.e., not the user computer) and going to the wireless access point (step 602). This step allows the anti-pharming module 400 to identify other wireless stations by their MAC addresses. The first data packet may have its "To DS" field set. Such a communication is important as it indicates activity by another wireless station, which is potentially a malicious computer. Being at pre-IP state, the anti-pharming module 400 cannot eliminate the possibility that other wireless stations are malicious computers.

If the first data packet originated from another wireless station and going to the wireless access point (step 602 to step 603), the anti-pharming module checks if the first data packet is destined for the computer 100 (step 603). This step may be performed by looking for the MAC address of the computer 100 in the "Addr 3" field of the data packet. If so (step 603 to step 604), the source of the first data packet is especially suspicious because it is from another wireless station communicating with the computer 100 in its pre-IP state The anti-pharming module continues monitoring wireless data communications to and from the wireless access point looking for a second data packet that is different from the first data packet and going from the wireless access point to a wireless station (step 604). Wireless data communications goring from the wireless access point to a wireless station may be identified as having a set "From DS" field. If the anti-pharming module 400 detects such a second data packet (step 604 to step 605), the anti-pharming module 400 checks if the second data packet is destined for the computer 100 (step 605) by, for example, looking for the MAC address of the user computer in the "Addr 1" field of the second data packet. If the second data packet is destined for the computer 100, the second data packet may be from the DHCP server or, as explained in the scenario of FIGS. 2 and 3, a malicious computer falsely representing itself as the DHCP server.

To determine whether the second data packet is from a legitimate DHCP server or a malicious computer, the anti-pharming module 400 may examine its stored history of previously monitored wireless data communications to and from the wireless access point. In one embodiment, the anti-pharming module 400 looks for previous data communications from another wireless station to the wireless access point destined for the computer 100 and sent during the pre-IP state of the computer 100. In the path from step 602 to step 603 to step 604 to step 605 and to step 606, such a data communication includes the first data packet. The anti-pharming module 400 may thus check if the source of the second data packet is the same as the source of the first data packet (step 606) to determine if the second data packet is originally from another wireless station rather than the DHCP server. Such a check may be performed by comparing the "Addr 3" field of the second data packet to the "Addr 2" field of the first data packet (step 606).

If the source of the first data packet is the same as the source of the second data packet (step 606 to step 607), the second data packet may be deemed from another wireless station and not the DHCP server. This is especially suspicious situation as the other wireless station is confirmed to be communicating with the computer 100 in its pre-IP state. When the computer 100 receives the second data packet (step 607), the anti-pharming module 400 checks the second data packet if it is providing network configuration information to the computer 100 for allowing the computer 100 to connect to the wireless computer network (step 608). For example, the anti-pharming module 400 may check the second data packet if it is a DHCPOFFER.

If the second data packet provides network configuration information (step 608 to step 609), which is a DHCPOFFER packet in this example, the anti-pharming module 400 checks if the network configuration information is in response to its earlier request for service to connect to the wireless computer network (step 609). The anti-pharming module may perform this step by comparing the transaction ID of the second data packet to the transaction ID of its request. If a match is found, i.e., the second data packet is from another wireless station and is responsive to the request for service to connect to the wireless computer network previously made by the computer 100, the anti-pharming module 400 may deem the other wireless station to be a malicious computer perpetrating a pharming attack (step 609 to step 610). In that case, the anti-pharming module 400 may perform a predetermined action (step 610), such as report the pharming attack to the user by displaying a warning message, for example.

Method and apparatus for preventing pharming attacks against computers in wireless computer networks at pre-IP state have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of protecting a user computer against malicious computers in a wireless computer network, the method to be performed by the user computer and comprising:

monitoring data packets going to and from a wireless access point of a wireless computer network to identify a first data packet going from a wireless station to the wireless access point;

monitoring data packets going to and from the wireless access point to identify a second data packet going from the wireless access point to the user computer;

determining if the second data packet is from the wireless station rather than a DHCP server of the wireless computer network; and deeming the wireless station to be a malicious computer perpetrating a pharming attack to direct data communications from the user computer through the wireless station when the second data packet originated from the wireless station and the second data packet is responsive to a request for DHCP service originated by the user computer prior to detecting the first data packet, the request for DHCP service being for the DHCP server rather than the wireless station;

wherein the second data packet is received in the user computer in a pre-IP state of the user computer before a TCP/IP networking stack of the user computer has been configured to allow data communication over the wireless computer network.

2. The method of claim 1 wherein the wireless station comprises a laptop computer.

3. The method of claim 1 wherein the user computer comprises a laptop computer.

4. The method of claim 1 wherein the user computer compares a transaction ID of the request for DHCP service originated by the user computer to a transaction ID of a DHCP response in the second data packet.

5. The method of claim 1 wherein determining if the second packet is from the wireless station rather then the DHCP server of the wireless computer network comprises:

comparing a MAC address indicated in an "Addr 2" field of the first data packet to a MAC address indicated in an "Addr 3" field of the second data packet.

6. A computer having memory and a processor configured to execute computer-readable program code in the memory, the memory comprising:

an anti-pharming module comprising computer-readable program code configured to monitor data communications between a wireless access point of a wireless computer network and wireless stations, to detect a first data packet from a wireless station to the wireless access point, to detect a second data packet from the wireless access point to the computer, and to deem the wireless station to be a malicious computer when the second data packet is from the wireless station that sent the first data packet to the wireless access point and the wireless station is responding to a request for DHCP service initiated by the computer in its pre-IP state before the computer has completed configuration to access the wireless computer network.

7. The computer of claim 6 wherein the anti-pharming module determines if data communication destined to the computer is from the wireless station rather than a DCHP server by comparing a MAC address indicated in an "Addr 2" field of the first data packet to a MAC address indicated in an "Addr 3" field of the second data packet.

8. The computer of claim 6 wherein the computer comprises a laptop computer.

9. The computer of claim 6 wherein the anti-pharming module is configured to compare a transaction ID of data communication initiated by the wireless station to a transaction ID of data communication for the request for DHCP service.

10. A computer-implemented method of protecting a user computer against malicious computers in a wireless computer network, the method comprising:

detecting a first wireless data communication from a first computer to a wireless access point;

detecting a second wireless data communication from the wireless access point to a second computer;

determining if the second wireless data communication is from the first computer; and deeming the first computer a malicious computer based on detecting that the second wireless data communication is from the first computer and the second wireless data communication is responsive to a request by the second computer to receive a network address from a server configured to dynamically provide a network address to computers connecting to the wireless computer network;

wherein the second computer receives the second wireless data communication in a pre-IP state before the second computer has been configured to communicate over the wireless computer network.

11. The method of claim 10 further comprising:

comparing a source of the first wireless data communication to a source of the second wireless data communication, the first wireless data communication occurring before the second wireless data communication and transmitted towards the wireless computer network.

12. The method of claim 10 wherein the server comprises a DHCP server.

13. The method of claim 10 wherein the first computer is perpetrating a pharming attack by directing the second computer to the first computer.

14. The method of claim 10 wherein the second computer comprises a laptop computer.

15. The method of claim 10 wherein the request to receive a network address from the server is a request for DHCP service.

* * * * *